United States Patent [19]

Bremmer et al.

[11] Patent Number: 4,802,011
[45] Date of Patent: Jan. 31, 1989

[54] PICTURE PICK-UP DEVICE WITH AN IMAGE SENSOR IN THE FORM OF A CHARGE TRANSFER DEVICE

[75] Inventors: Jacob G. Bremmer; Cornelis A. M. Jaspers, both of Eindhoven, Netherlands

[73] Assignee: U.S. Philips Corp., New York, N.Y.

[21] Appl. No.: 57,192

[22] Filed: Jun. 3, 1987

[30] Foreign Application Priority Data

Jun. 24, 1986 [NL] Netherlands .................. 8601638

[51] Int. Cl.⁴ ............................................. H04N 3/14
[52] U.S. Cl. ........................... 358/213.15; 358/213.17
[58] Field of Search ................... 358/36, 167, 213.15, 358/213.17, 213.31, 212; 250/578

[56] References Cited

U.S. PATENT DOCUMENTS

| | | | |
|---|---|---|---|
| 4,167,755 | 9/1979 | Nagumo | 358/213.15 |
| 4,189,751 | 2/1980 | Nagumo | 358/213.17 |
| 4,549,215 | 10/1985 | Levine | 358/213.15 |
| 4,556,800 | 12/1985 | Ohta et al. | 250/578 |

FOREIGN PATENT DOCUMENTS 0140292 5/1985 European Pat. Off. .

*Primary Examiner*—L. T. Hix
*Assistant Examiner*—David M. Gray

*Attorney, Agent, or Firm*—William L. Botjer

[57] ABSTRACT

An image sensor (PSR) in the form of a charge transfer device comprises picture pick-up elements (p) for converting incident radiation into electric charge and a charge transfer shift register (SR) for periodically shifting the charges under the control of clock pulses (S1) to a sensor output terminal (TSR) for the supply of a pulsatory picture signal with periodically occurring reset pulses and picture signal pulses. The output terminal (TSR) is succeeded by a series arrangement (SC) of at least a signal clamping circuit (CL) for the reset pulses, a resettable signal smoothing and hold circuit (SS) for the picture signal pulses and a signal sampling circuit (SH) for the picture signal pulses. By virtue of the signal smoothing it is achieved that interferences have a minimum influence on the picture signal sample values. The signal smoothing and hold circuit (SS) is in the form of, for example, a peak voltage detector or of a current source integrator for the picture signal pulses. Besides, for performing a defective picture pick-up element correction an on-off switching circuit (SW) is present between the signal clamping circuit (CL) and the resettable signal smoothing and hold circuit (SS), while the resetting at the signal smoothing and hold circuit (SS) is switched off when the switching circuit (SW) is switched off.

6 Claims, 4 Drawing Sheets

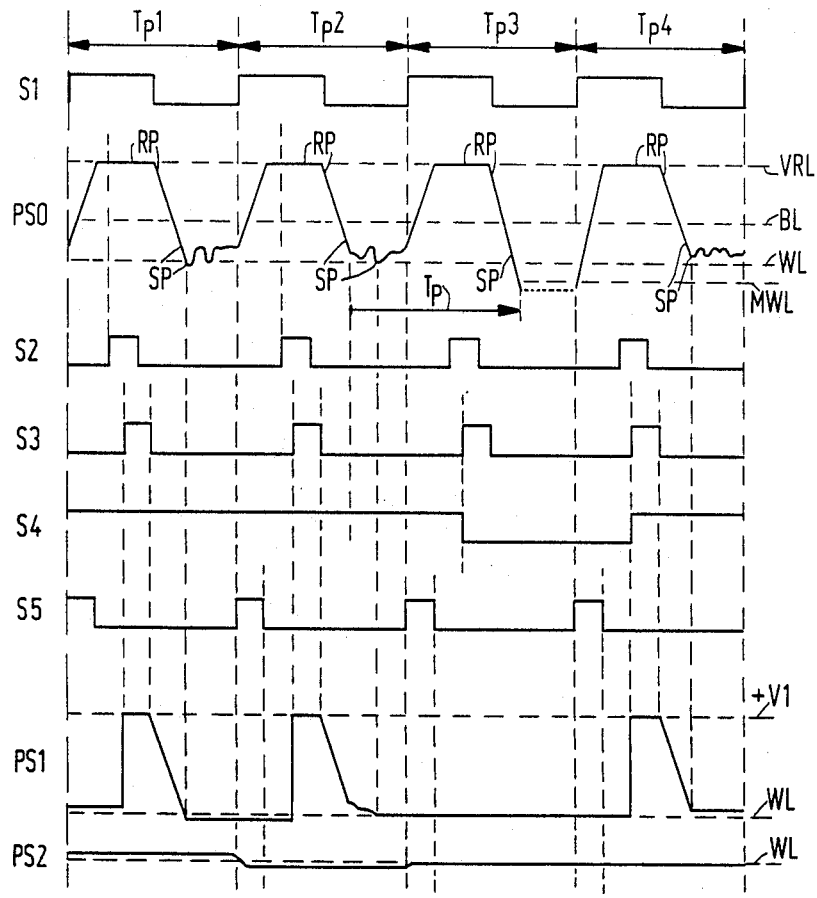
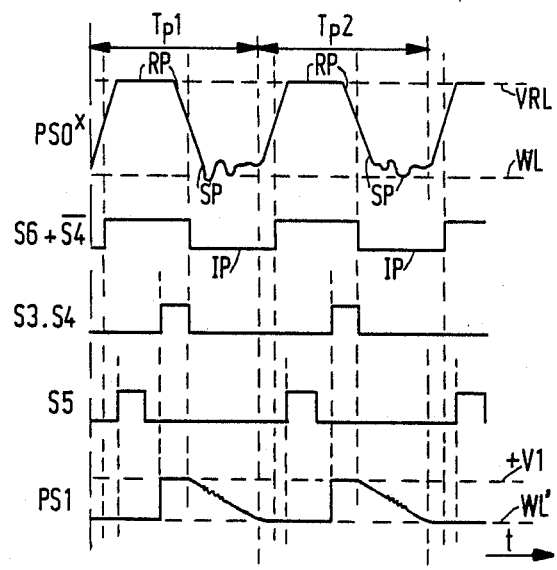
FIG. 3
FIG. 5

PICTURE PICK-UP DEVICE WITH AN IMAGE SENSOR IN THE FORM OF A CHARGE TRANSFER DEVICE

BACKGROUND OF THE INVENTION

The invention relates to a picture pick-up device provided with an image sensor in the form of a charge transfer device, which image sensor comprises picture pick-up elements for converting incident radiation into electric charge and a charge transfer shift register for periodically shifting the charges under the control of clock pulses originating from a control signal generator to a sensor output terminal for the supply of a pulsatory picture signal with periodically occurring reset pulses and picture signal pulses, said picture pick-up device further comprising a series arrangement of at least a signal clamping circuit for at least a part of a reset pulse and a signal sampling circuit for at least a part of a picture signal pulse, said series arrangement being coupled to the sensor output terminal and being controlled from the control signal generator.

A picture pick-up device of this type is known from European Patent Application No. 0,140,292. The application describes that on the one hand the reset pulses in the pulsatory picture signal are beset at a reset level with high-frequency thermal noise originating from a conducting reset transistor which is present in the shift register at the output terminal and on the other hand lead to a low-frequency reset noise caused by the variable amplitude of the reset clock pulses obtained by crosstalk in the picture signal. Both noise sources lead to a deterioration of the signal-to-noise ratio of the picture signal at which particularly the low-frequency reset noise seriously perturbs the quality of a reproduced picture.

The so-called "correlated double sampling" is mentioned as a known solution to improve the signal-to-noise ratio. The reset pulse in the picture signal then has a reset level (with noise and interference) and a constant reference level deviating therefrom at which the signal clamping circuit is active. The said Patent Application states as disadvantages: the short period of time in which the reference level is present for the signal clamping operation, the crosstalk from the short-lasting clamping clock pulse to the picture signal and the deterioration of the signal-to-noise ratio in the event that high-frequency noise is present at the reference level.

A given construction of the signal sampling circuit for the picture signal is given as the own solution for the signal-to-noise ratio improvement. In this case this circuit comprises two switches with which during the presence of the picture signal pulses at the circuit input these pulses are passed on to the circuit output by the one switch whilst the other switch is open, and the one switch is open between the picture signal pulses whilst a reference voltage is supplied to the circuit output via the other switch. It appears that the proposed signal sampling circuit for the pulsatory picture signal simply passes the picture signal pulses without any influence. The same applies to noise and interference which may be present in the picture signal pulses, which interference is caused, for example, by clock pulse crosstalk upon shifting the charges in the charge transfer shift register. Such an interference may also be present in a picture signal for which the correlated double sampling is applied. The erratic signal variation obtained by the interference in the picture signal pulses leads to a picture signal pulse sampling with an obtained sampled value which is dependent on the instantaneous interference value.

SUMMARY OF THE INVENTION

It is an object of the invention to realize a picture pick-up device in which the signal sampling circuit supplies an output signal without the said noise and interference and with a sample value which does not depend on the instantaneous interference value which is present at the input signal. According to the invention a picture pick-up device is therefore characterized in that a resettable signal smoothing and hold circuit for the picture signal pulses, is present between the signal clamping circuit and the signal sampling circuit in the said series arrangement which signal smoothing and hold circuit is formed with a reset input which is coupled to the control signal generator.

The use of the resettable signal smoothing and hold circuit behind the signal clamping circuit and preceding the signal sampling circuit leads to such a smoothing of the erratic signal variations at the picture signal pulses that the instantaneous interference values affect the sample values obtained to a minimum extent.

An embodiment of a picture pick-up device according to the invention with a simple resettable signal smoothing and hold circuit for the picture signal pulses is characterized in that the signal smoothing and hold circuit is formed as a peak voltage detector for the picture signal pulses.

Another embodiment in which noise averaging is present is characterized in that the signal smoothing and hold circuit is formed as a current source integrator for the picture signal pulses, which integrator is further formed with an integration pulse input coupled to the control signal generator.

An embodiment of a picture pick-up device in which both the improved picture signal sampling and a picture signal correction for defective picture pick-up elements at the image sensor is present is characterized in that an on-off switching circuit is present between the signal clamping circuit and the resettable signal smoothing and hold circuit, which switching circuit is formed with a switching input coupled to the control signal generator, the resetting at the signal smoothing and hold circuit being switched off when the switching circuit is switched off. Consequently the information originating from a defective picture pick-up element is replaced by that of the preceding, non-defective picture pick-up element In the event that preliminary information regarding defective picture pick-up elements is present in the picture pick-up device, a further embodiment according to the invention is characterized in that the control signal generator is coupled to a programmable memory for storage of information regarding defective picture pick-up elements present at the image sensor, the control signal generator switching off the switching circuit and the resetting at the signal smoothing and hold circuit when defective picture pick-up elements occur.

In the event that no preliminary information is present, another further embodiment is characterized in that the sensor output terminal is coupled to a picture signal input of a maximum white threshold circuit and is coupled via a delay device having a time delay of one period of the picture pick-up elements is coupled to the said series arrangement, the switching circuit and the resetting at the signal smoothing and hold circuit being switched off when the input picture signal exceeds a maximum white threshold level.

BRIEF DESCRIPTION OF THE DRAWINGS

The invention will be described in greater detail by way of example with reference to the accompanying drawing in which FIG. 3 shows some signal diagrams as a function of time to illustrate the operation of the device according to FIG. 1 and the circuit diagram according to FIG. 2, FIG. 5 shows some signal diagrams as a function of time to explain the operation of the device according to FIG. 1 and the circuit diagram according to FIG. 4.

DETAILED DESCRIPTION OF THE PREFERRED EMBODIMENTS

Figure 1:
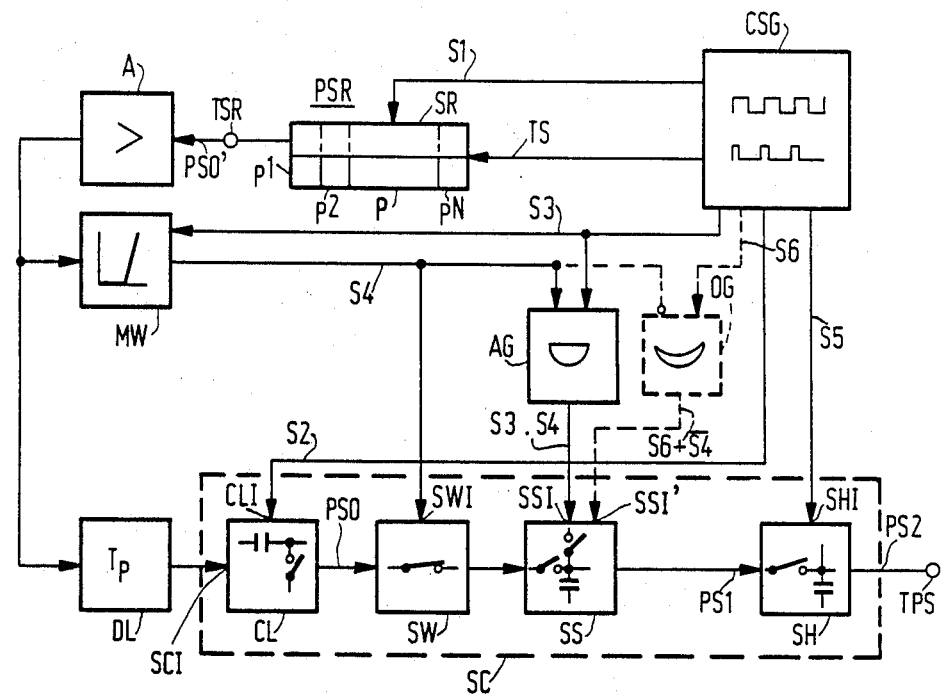
FIG. 1 is a block-schematic diagram of an embodiment of a picture pick-up device according to the invention.

In FIG. 1 the reference PSR denotes an image sensor in the form of a charge transfer device in the embodiment of a picture pick-up device shown in the block-schematic diagram. The image sensor PSR is shown with a pick-up member P comprising a row of picture pick-up elements p1, p2 to pN inclusive for converting incident radiation such as, for example, light into electric charges. This conversion takes place because light photons generate electrons and holes at a reverse-biased p-n semiconductor junction in the picture pick-up elements, which lead to a discharge of the semiconductor junction. Furthermore the image sensor PSR has a charge transfer shift register SR which is shielded from light. After a light integration period in which the picture pick-up elements p build up the electric charges as picture information, dependent on the intensity of the incident light radiation, a control signal generator CSG applies a transfer signal TS to the image sensor PSR so that the electric charges as picture information are transferred to associated register elements in the shift register SR and a resetting to a reference value at the picture pick-up elements p is effected. While the next light integration is effected at the pick-up member P from the reference value, the electric charges are shifted to a sensor output terminal TSR in the shift register SR under the control of a clock pulse signal S1 originating from the generator CSG. By shifting the charges, a pulsatory picture signal PSO' with periodically occurring reset pulses and picture signal pulses occurs at the terminal TSR. To illustrate the picture signal PSO' a signal diagram of a pulsatory picture signal PSO is shown by way of example as a function of time t in FIG. 3 in which, as will be evident hereinafter, the signal PSO not only has a signal amplification and signal clamping but also a time delay with respect to the signal PSO'. The periodical reset pulses and picture signal pulses are denoted by RP and SP, respectively, at the signal PSO shown. Furthermore FIG. 3 shows a signal diagram of the clock pulse signal S1 as is associated with the signal PSO. The references Tp1, Tp2, Tp3 and Tp4 denote some picture pick-up element periods. A reset voltage level is denoted by VRL at the signal PSO at the reset pulses RP, and a black level is denoted by BL, a white level by WL and a maximum white threshold level by MWL at the picture signal pulses SP. The picture signal pulses SP occurring during the periods Tp1, Tp2 and Tp4 are shown with interference and noise, whilst the picture signal pulse SP during the period Tp3 is shown with a pulse value which exceeds the level MWL. This pulse SP (Tp3) is assumed to be associated with a defective picture pick-up element p of the image sensor PSR. The defect implies that the local p-n semiconductor junction is short-circuited which corresponds to a maximum discharge in the case of a non-defective picture pick-up element so that the maximum white threshold level MWL is exceeded to an extreme (white) value.

Instead of the embodiment of the image sensor PSR with the picture pick-up member P and the shielded shift register SR shown by way of example in FIG. 1, the image sensor may be in the form as described in the said Patent Application. In this case the picture pick-up elements form part of the shift register so that light integration simultaneously continues when the electric charges are shifted in this register. Independent of the form of the image sensor it is assumed that the picture signal pulses SP have the interference and noise shown. The interference is caused by, for example, crosstalk and transient phenomena from the clock pulse signal S1 and/or from other signals which are present in the components of the picture pick-up device.

Figure 2:
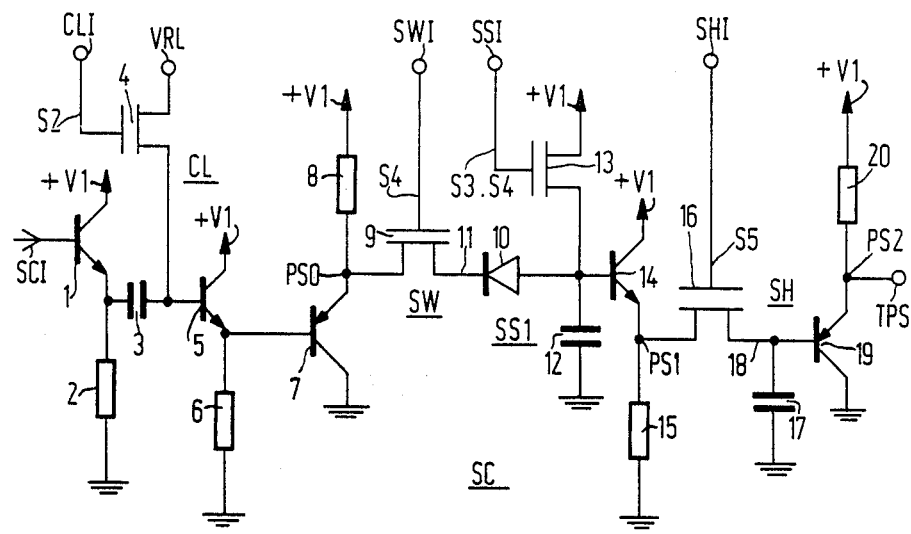
FIG. 2 shows a detailed circuit diagram of a series arrangement according to the invention which can be used in the device according to FIG. 1 and comprises a signal smoothing and hold circuit in the form of a peak voltage detector.
Figure 4:
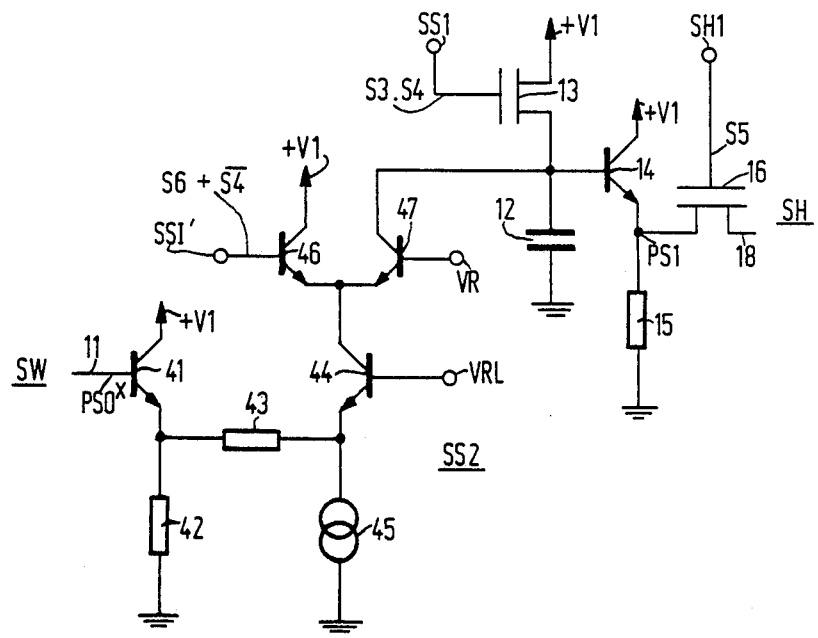
FIG. 4 shows a detailed circuit diagram of a part of the series arrangement in which the signal smoothing and hold circuit is formed as a current source integrator.

The picture signal PSO' of FIG. 1 which, as far as the picture information is concerned, has the same shape as the shape of the delayed picture signal PSO shown in FIG. 3 is applied to an amplifier circuit A. The output of the amplifier circuit A is coupled to an input of a delay device DL having a time delay which is equal to a picture element period Tp and to an input of a maximum white threshold circuit MW. The threshold circuit MW is active with a threshold level which corresponds to the maximum white threshold level MWL shown in FIG. 3 at the signal PSO. Subsequent to the delay device DL there is provided an input SCI of a series circuit SC successively comprising: a signal clamping circuit CL, an on-off switching circuit SW, a resettable signal smoothing and hold circuit SS and a signal sampling and hold circuit SH, which circuits SS and SH will further be briefly referred to as signal smoothing and signal sampling circuit, respectively. In the circuit blocks capacitors and switches are shown diagrammatically with their connections for the purpose of illustration of the operation. The control signal generator CSG is coupled to a clamping input CLI of the clamping circuit CL for the supply of a clamping signal S2 to this input. FIG. 3 shows a signal diagram of the clamping signal S2 as an example with clamping pulses having a given period. The generator CSG applies a signal S3 to the threshold circuit MW and supplies this signal via an AND gate circuit AG to a reset input SSI of the signal smoothing and hold circuit SS. The threshold circuit MW applies a signal S4 to a switching input SWI of the on-off switching circuit SW and to an input of the AND-gate circuit AG. As a result, the input SSI has a signal S3. S4 applied to it. The signal S4 is active as a defective picture element signal. It follows from the signals S3 and S4 shown in FIG. 3 that the signal S3 is active as a reset signal during the periods Tp1, Tp2 and Tp4 at the signal smoothing and hold circuit SS, the resetting being switched off during the period Tp3. The signal S4 ensures that the switching circuit SW is switched off during the period Tp3 and in this period during the occurrence of the picture signal pulse SP. The generator CSG applies a signal S5 as a sampling signal to a sampling input SHI of the signal sampling circuit SH, whilst a possible signal diagram of this signal S5 is shown in FIG. 3. FIG. 1 shows that the output of the clamping circuit CL supplies the signal PSO shown in FIG. 3. If the signal smoothing and hold circuit SS is in the form of a peak voltage detector for the picture signal pulses SP with which FIG. 2 is associated, the circuit SS supplies a signal PS1 shown in FIG. 3. The circuit SH derives a signal PS2 therefrom, which is also shown in FIG. 3, and which becomes available as an output picture signal at an output terminal TPS of the picture pick-up device. If the signal smoothing and hold circuit SS of FIG. 1 is in the form of a current source integrator for the picture signal pulses SP with which FIG. 4 is associated, the circuit SS supplies a signal PS1 shown in FIG. 5 which is obtained by means of the extra supply from the generator CSG of the signal S6 via an OR gate circuit OG to an integration pulse input SSI' of the signal smoothing and hold circuit SS. The signal S4 is applied to an inverting input of the circuit OG so that the input SSI' receives a signal S6+$\overline{S4}$.

In a comparison with the signal PSO, the signal PS1 of FIG. 3 shows the result of the addition of the signal smoothing and hold circuit SS in the form of the peak voltage detector and of the on-off switching circuit SW between the signal clamping circuit CL and the sampling circuit SH. The circuit SS with the peak voltage detector reset by the pulses in the signal S3 leads to the form shown of the signal PS1 during the periods Tp1, Tp2 and Tp4. Due to the addition of the on-off switching circuit SW, the threshold circuit MW, the gate circuit AG and the delay device DL the resetting at the circuit SS is not performed during the period Tp3 and no new picture information is applied to the circuit SS. Consequently the information originating from the defective picture pick-up element is replaced by that from the directly preceding, non-defective picture pick-up element. At the signal PSO of FIG. 3 the period Tp illustrates why the delay device DL with the same delay time is required. If several consecutive picture pick-up elements are defective, the picture information of the last preceding non-defective picture pick-up element is repeated as many times. The signal PS1 shows that there is no interference in this signal during the sampling pulses occurring in the signal S5. Consequently the instantaneous interference values do not occur in the sample values obtained in the signal PS2. The embodiment of the signal smoothing and hold circuit SS as a peak voltage detector results in the largest value of the interference at the picture signal pulses SP fixing the sample value, as is evident from a comparison of the signals PSO and PS2 at the white level WL.

In the known case in which the signal smoothing and hold circuit SS is absent, the sampling pulses occur in the signal S5 during the picture signal pulses SP of the signal PSO. Consequently the sample values will be directly dependent on the instantaneous interference values and ever-present mutual pulse edge shifts at the sampling pulses will increase the influence of interference. The signal smoothing and hold circuit SS provides a remedy for this. For the purpose of illustration an erratic signal variation, being an interference of 100 mV in amplitude over 10 ns, is mentioned by way of example so that a sampling pulse edge shift of 1 ns leads to a 10 mV amplitude change. Further examples are a voltage of 100 mV between the levels VRL and BL, 50 mV between the levels BL and WL and 80 mV between the levels BL and MWL.

FIG. 2 shows a detailed circuit diagram of the series arrangement SC in which the signal smoothing and hold circuit SS of FIG. 1 is in the form of a peak voltage detector SS1. The input SCI of the series circuit SC is connected to a base electrode of an npn transistor 1 which operates with a resistor 2 as an emitter follower (1, 2) and is present between a supply terminal conveying a voltage +V1 and ground. The supply terminal +V1 forms part of a supply voltage source another terminal of which is connected to ground. The voltage V1 is equal to, for example, 5 V. The emitter electrode of the transistor 1 is connected via a capacitor 3 to a source electrode of a transistor 4 formed with an insulated gate electrode and to a base electrode of an npn transistor 5. The transistor 4 is, for example, a MOSFET n-channel enhancement-mode transistor such as transistors with insulated gate electrodes to be further described. The gate electrode of the transistor 4 is connected to the clamping input CLI to which the signal S2 is applied. The drain electrode of the transistor 4 is connected to a terminal conveying a reference voltage VRL which is described as a reset voltage level at the signal PSO of FIG. 3. The voltage VRL is equal to, for example, 2.1 V. The transistor 5 is present with a series resistor 6 between the supply terminal +V1 and ground and together they constitute an emitter follower (5, 6). The emitter electrode of the transistor 5 is connected to a base electrode of a pnp transistor 7 which in series with a resistor 8 and disposed between the supply terminal +V1 and ground forms part of an emitter follower (7, 8). It has been indicated at the emitter electrode of the transistor 7 that the signal PSO occurs across this electrode.

The emitter electrode of the transistor 7 is connected to the source electrode of a transistor 9 formed with an insulated gate electrode which is connected to the switching input SWI to which the switching signal S4 is applied. The transistor 9 operates as the on-off switching circuit SW. The drain electrode of the transistor 9 is connected to the cathode of a diode 10, the connection being denoted by the reference numeral 11. The diode 10 operates as a switch in a peak voltage detector SS1 for the picture signal pulses SP in the signal PSO of FIG. 3. The anode of the diode 10 is connected to ground via a capacitor 12 and is connected to a source electrode of a transistor 13 formed with an insulated gate electrode which is connected to the reset input SSI to which the signal S3.S4 is applied. The drain electrode of the transistor 13 is connected to the supply terminal +V1. The transistor 13 ensures resetting at the capacitor 12 after a peak voltage detection if no information is presented from a defective picture pick-up element.

The voltage-conveying terminal of the capacitor 12 is connected to a base electrode of an npn transistor 14 which in series with a resistor 15 is present between the supply terminal +V1 and ground and together they operate as an emitter follower (14, 15). The emitter electrode of the transistor 14 conveying the signal PS1 is connected to a source electrode of a transistor 16 formed with an insulated gate electrode which is connected to the sampling input SHI to which the signal S5 is applied. During resetting with the aid of the reset transistor 13 the voltage +V1 as indicated in the signal diagram of the signal PS1 of FIG. 3 occurs in the signal PS1. Voltage drops across conducting transistors and base-emitter threshold voltages at these transistors are ignored in this case. The drain electrode of the transistor 16 is connected to ground via a capacitor 17. The reference numeral 18 denotes the connection between the transistor 16 and the capacitor 17, which connection is connected to a base electrode of a pnp transistor 19. Together with a series resistor 20, the transistor 19 is disposed between the supply terminal +V1 and ground and together they constitute an emitter follower (19, 20). The emitter electrode of the transistor 19 conveying the voltage PS2 is connected to the output terminal TPS of the picture pick-up device. As compared with the block diagram of FIG. 1, FIG. 2 shows the clamping circuit CL with the components 1 to 8, inclusive, the on-off switching circuit SW with the transistor 9, the signal smoothing and hold circuit SS in the peak detector form SS1 with the components 10, 12, 13, 14 and 15, and the signal sampling circuit SH with the components 16, 17, 19 and 20.

FIG. 4 shows a circuit diagram for the signal smoothing and hold circuit SS of FIG. 1 in the form of a current source integrator SS2. The current source integrator SS2 is present between the connections 11 and 18 indicated in FIG. 2. In FIG. 4 the components 12 to 16 inclusive are shown in the same manner as in the circuit diagram of FIG. 2. For the purpose of illustration of the influence and the operation of the current source integrator SS2, FIG. 5 shows some signal diagrams as a function of time t, more specifically for the picture pick-up periods Tp1 and Tp2 already indicated in FIG. 3. FIG. 5 shows the signal PSO$^x$ which is assumed to occur at the connection 11 of FIG. 4 and which is identical to the signal PSO of FIG. 3 during the periods Tp1 and Tp2. The connection 11 is connected to the base electrode of an npn-transistor 41 which in series with a resistor 42 is present between the supply terminal +V1 and ground and together they constitute an emitter follower (41, 42). The emitter electrode of the transistor 41 is connected via a resistor 43 to the emitter electrode of an npn transistor 44 which is also connected to ground via a current source 45. The base electrode of the transistor 44 is connected to a terminal on which the voltage VRL is present, which voltage is indicated at the signal PSO$^x$ of FIG. 5. The collector electrode of the transistor 44 is connected to the emitter electrodes of two npn transistors 46 and 47. The collector electrode of the transistor 46 is connected to the supply terminal +V1, whilst the base electrode is connected to the integration pulse input SSI' to which the signal S6+$\overline{S4}$ shown in FIG. 5 is applied. The base electrode of the transistor 47 is connected to a terminal conveying a voltage VR as a bias voltage. The voltage VR has a value which is smaller than the voltage +V1. The collector electrode of the transistor 47 is connected to the junction point of the capacitor 12, the reset transistor 13 and the emitter follower transistor 14.

The operation of the signal smoothing and hold circuit SS in the form of the current source integrator SS2 is explained with reference to the signal diagrams of FIG. 5. The signal S6 which is present in the signal combination S6+$\overline{S4}$ has pulses at which the transistor 46 is turned on during the reset pulses RP of the signal PSO$^x$ and at which the transistor 46 is turned off during the picture signal pulses SP. The transistors 41, 44 and 47 of the current source integrator SS2 are initially in a conducting state and initially there is a decreasing voltage across the capacitor 12. When the transistor 46 becomes and is conducting, the transistor 47 is and remains turned off so that with the reset transistor 13 being turned off the voltage present upon turn-off across the capacitor 12 remains constant Subsequently a sampling pulse occurs in the signal S5 so that the signal sampling and hold circuit SH takes a sample and retains it. After this a reset pulse occurs in the signal S3.S4 at which the transistor 13 is turned on and the voltage +V1 occurs across the capacitor 12. Immediately or some time after the reset pulse the trailing pulse IP occurs in the signal S6+$\overline{S4}$ at which the transistor 46 is turned off. Turning-off of the transistor 46 is accompanied by the transistor 47 being turned on. The value of the current flowing through the transistor 47 is then dependent on the instantaneous voltage value in the signal PSO$^x$. A lower or higher voltage value in the signal PSO$^x$ is accompanied by a higher or lower current, respectively, from the transistor 44 through the resistor 43, which current leads via the transistor 47 to a faster or slower decrease of the voltage across the capacitor 12. The duration of the pulses IP of the signal S6 determines the duration in which the decrease of the voltage across the capacitor 12 occurs. The pulses IP of the signal S6 are therefore active as integration pulses at the current source integrator SS2, whilst the ultimate decrease of the voltage across the capacitor 12 is dependent on the product of current and duration In the case of a defective picture pick-up element the signal $\overline{S4}$ in the signal combination S6+$\overline{S4}$ ensures that the transistor 46 remains turned on. Consequently the transistor 47 remains turned off and simultaneously there is no resetting via the transistor 13 under the control of the signal S3.S4.

The use of the signal smoothing and hold circuit SS in the form of the current source integrator SS2 produces a noise averaging due to the current integration so that with respect to the use of the peak voltage detector SS1 an improved signal-to-noise ratio at the signals PS1 and PS2 is the result. Furthermore a comparison of the signal PS1 of FIG. 5 with that of FIG. 3 shows that upon the occurrence of the sampling pulses of the signal S5 subsequent to the periods Tp1 and Tp2 one and the same signal level WL' is present and signal levels which are lower than and equal to WL are present, respectively. The current integration prevents the influence of extreme interference peaks at the sample value. When using the peak voltage detection the value is influenced. This is offset by the attractive simplicity of the peak voltage detection.

Figure 6:
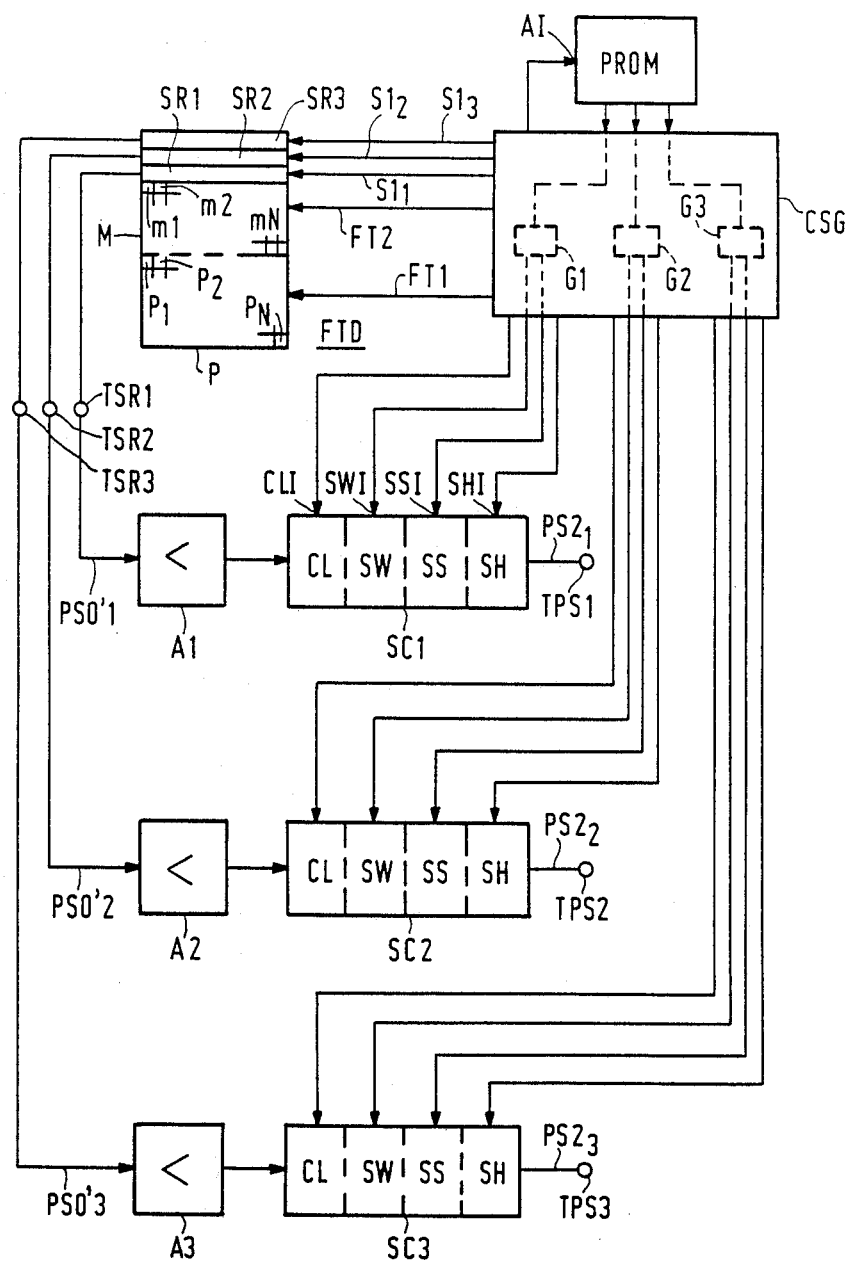
FIG. 6 is a block-schematic diagram of an embodiment of a picture pick-up device which is formed with a field transfer device as an image sensor for colour recording.

FIG. 6 shows a block diagram for an embodiment of a picture pick-up device according to the invention which is formed with a field transfer device as an image sensor denoted by FTD for colour recording. Such an image sensor is available under the indication NXA 1021 or NXA 1041 for which reference is made to the Philips Data Handbooks for information. In the colour recording embodiment there are three different strip-shaped filters present at the image sensor FTD. Image sensors without strip-shaped filters for monochrome picture recording are available under the indications NXA 1011 and NXA 1031.

The diagram of FIG. 6 shows blocks with designations already shown in FIG. 1 and furthermore there are adapted designations. The pick-up member P of the image sensor FTD is formed with picture pick-up elements p1, p2 to pN inclusive arranged in rows and columns. The columns of picture pick-up elements are coupled to columns of memory elements m1, m2 to mN, inclusive of a storage member of the image sensor FTD, which member is shielded from light radiation. Three parallel-in, series-out shift registers SR1, SR2 and SR3 are connected to these memory columns. After a light integration period picture information is transferred from the pick-up member P to the storage member M under the control of transfer signals FT1 and FT2 originating from the generator CSG. Subsequently the picture information is transferred row by row from the memory rows in a distributive manner to the three shift registers SR under the control of the signal FT2. After parallel filling of the three shift registers SR1, SR2 and SR3 these are each read in series under the control of clock pulse signals $S1_1$, $S1_2$ and $S1_3$, respectively. These clock pulse signals are comparable to the clock pulse signal S1 shown in FIG. 3, whilst the signals $S1_1$, $S1_2$ and $S1_3$ have a phase shift of 120°. Particularly for the embodiment with the three phase-shifted clock pulse signals S1 at the three shift registers SR strong interferences caused by crosstalk may be present in the register output signals. The image sensor FTD has three output terminals TSR1, TSR2 and TSR3 associated with the respective three shift registers SR. The output terminal TSR1 at which a picture signal PS0' occurs is succeeded by an amplifier circuit A1 in series with a series circuit SC1 comprising the signal clamping circuit CL, the on-off switching circuit SW, the signal smoothing circuit SS and the signal sampling circuit SH. The series circuit SC1 applies a signal $PS2_1$ to an output terminal TPS1 of the picture pick-up device. The reference CLI, SWI, SSI (including SSI') and SHI denote the various inputs FIG. 6 shows at the generator CSG that the signals for the inputs SWI and SSI originate from a generator G1 which thus supplies the signals which are associated with the defective picture pick-up element correction. Information regarding the defective picture pickup elements is stored in a programmable memory PROM which is coupled to the generator G1. Address inputs of the memory PROM are indicated by a single input A1 and these are connected to the generator CSG. A programmable read-only memory is indicated as an example and a random access memory RAM is mentioned as an example for another embodiment. Prior to a picture recording and in the case of an equal exposure of the pick-up member P at white level, one or more grey levels and/or black level it has been detected which picture pick-up elements have a picture signal value different from the expected signal value. These picture pick-up elements are considered as defective picture pick-up elements and preliminary information thereabout is stored in the memory PROM. In comparison with the defective picture pick-up element correction described with reference to FIG. 1 the circuits MW and AG and the device DL are absent and defects at different exposure levels are taken into account As described at the output terminal TSR1, the output terminals TSR2 and TSR3 are succeeded by amplifier circuits A2 and A3 and series circuits SC2 and SC3, respectively, leading to output signals $PS2_2$ and $PS2_3$ at output terminals TPS2 and TPS3, respectively. Likewise, respective generators G2 and G3 are present in the control signal generator CSG for the defective picture pick-up element correction.

If the image sensor FTD is of the type for monochrome picture recording, there are also three output shift registers SR. In a possible embodiment of the picture pick-up device each output terminal TSR is succeeded in this case by an associated amplifier circuit A and a signal clamping circuit CL which may be succeeded by a time division multiplex circuit and a single series circuit (SW, SS, SH) in series therewith. Another embodiment may be a device with a time division multiplex circuit succeeding the terminals TPS1, TPS2 and TPS3.

What is claimed is:

1. A picture pick-up device provided with an image sensor in the form of a charge transfer device, which image sensor comprises picture pick-up elements for converting incident radiation into electric charge and a charge transfer shift register for periodically shifting the charges under the control of clock pulses originating from a control signal generator to a sensor output terminal for the supply of a pulsatory picture signal with periodically occurring reset pulses and picture signal pulses, said picture pick-up device further comprising a series arrangement of at least a signal clamping circuit for at least a part of a reset pulse and a signal sampling circuit for at least a part of a picture signal pulse, said series arrangement being coupled to the sensor output terminal and being controlled from the control signal generator, characterized in that a resettable signal smoothing and hold circuit for the picture signal pulses is disposed between the signal clamping circuit and the signal sample circuit in the said series arrangement, which signal smoothing and hold circuit includes a reset input which is coupled to the control signal generator.

2. A picture pick-up device as claimed in claim 1, characterized in that the signal smoothing and hold circuit comprises a peak voltage detector for the picture signal pulses.

3. A picture pick-up device as claimed in claim 1, chacacterized in that the signal smoothing and hold circuit comprises a current source integrator for the picture signal pulses, which integrator further includes an integration pulse input coupled to the control signal generator.

4. A picture pick-up device as claimed in claim 1, characterized in that an on-off switching circuit is present between the signal clamping circuit and the resettable signal smoothing and hold circuit, which switching circuit includes a switching input coupled to the control signal generator, the resetting at the signal smoothing and hold circuit being switched off when the switching circuit is switched off.

5. A picture pick-up device as claimed in claim 4, characterized in that the control signal generator is coupled to a programmable memory for the storage of information regarding defective picture pick-up elements present at the image sensor, the control signal generator switching off the switching circuit and the resetting at the signal smoothing and hold circuit when defective picture pick-up elements occur.

6. A picture pick-up device as claimed in claim 4, characterized in that the sensor output terminal is coupled to a picture signal input of a maximum white threshold circuit and is coupled via a delay device having a time delay of one period of the picture pick-up elements is coupled to the said series arrangement, the switching circuit and the resetting at the signal smoothing and hold circuit being switched off when the input picture signal exceeds a maximum white threshold level.

* * * * *